United States Patent [19]

Larkin

[11] Patent Number: 4,519,383
[45] Date of Patent: May 28, 1985

[54] ANTI-REVERSE SIPHON SOLAR HEATING SYSTEM

[76] Inventor: William J. Larkin, 432 Begonia, Corona del Mar, Calif. 92625

[21] Appl. No.: 595,485

[22] Filed: Mar. 30, 1984

[51] Int. Cl.³ .............................................. F24J 3/02
[52] U.S. Cl. .................................. 126/430; 126/434; 126/437; 126/431
[58] Field of Search ............... 126/433, 434, 422, 432, 126/435, 429, 450, 431, 437, 430

[56] References Cited

U.S. PATENT DOCUMENTS

| | | | |
|---|---|---|---|
| 3,832,992 | 9/1974 | Trombe et al. | 126/429 |
| 4,121,565 | 10/1978 | Grisbrook | 126/429 |
| 4,300,532 | 11/1981 | Olsen | 126/429 |
| 4,416,255 | 11/1983 | Secamiglio et al. | 126/429 |

FOREIGN PATENT DOCUMENTS

| | | | |
|---|---|---|---|
| 33562 | 3/1980 | Japan | 126/434 |
| 72844 | 4/1983 | Japan | 126/434 |

Primary Examiner—James C. Yeung
Attorney, Agent, or Firm—Ralph S. Branscomb

[57] ABSTRACT

A solar heater which is adapted for liquid heating and space heating, or both, utilizes a passive anti-reverse siphon concept in which fresh air or water is required to traverse upwardly along a passageway and then descend along a descending passageway insulated from the ascending passageway before it enters the solar heating chamber, with the result that the pressure heads generated in the ascending and descending passageways and the heating chamber offset one another such that forward, passive solar heating convection occurs, but in the evening when the heating chamber becomes cool, the normal reverse convection that occurs in passive units is stopped.

7 Claims, 8 Drawing Figures

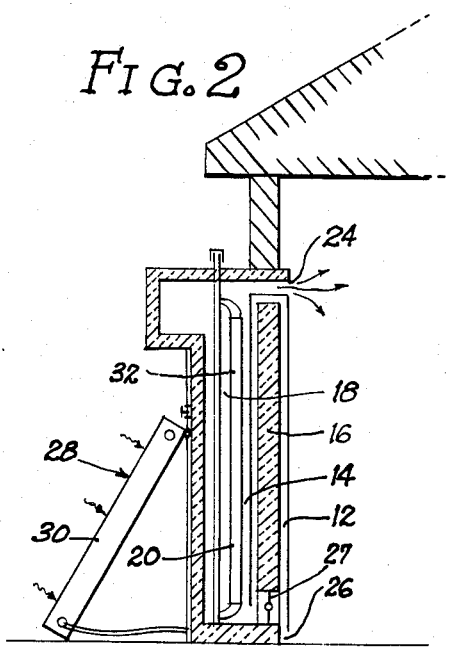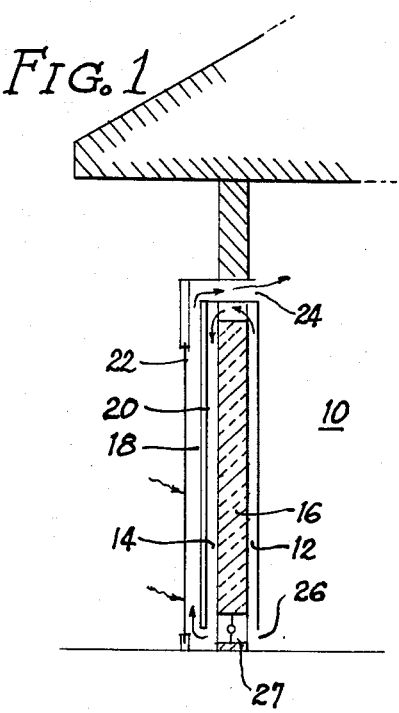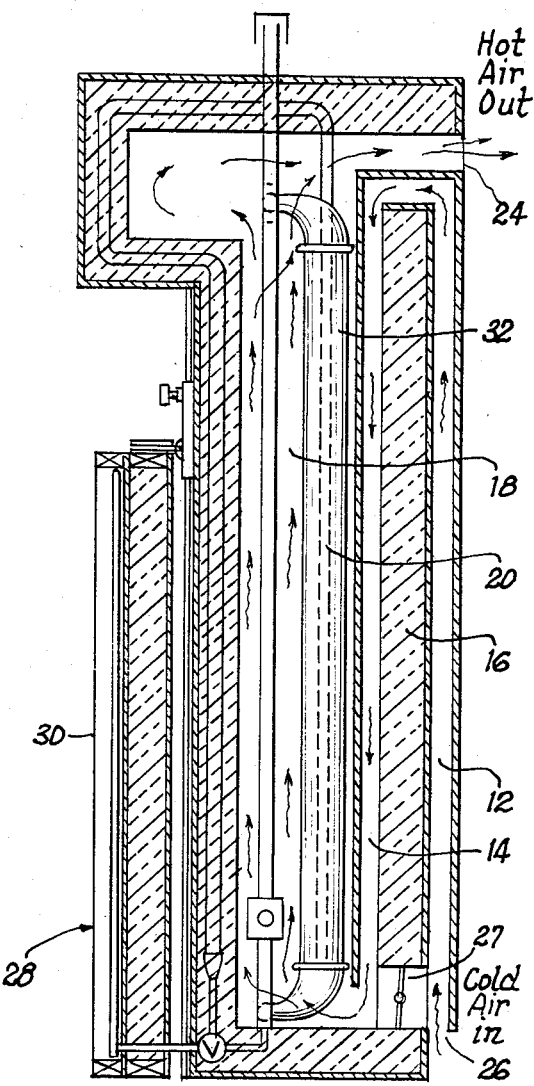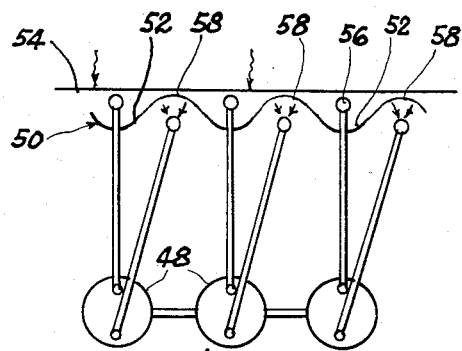

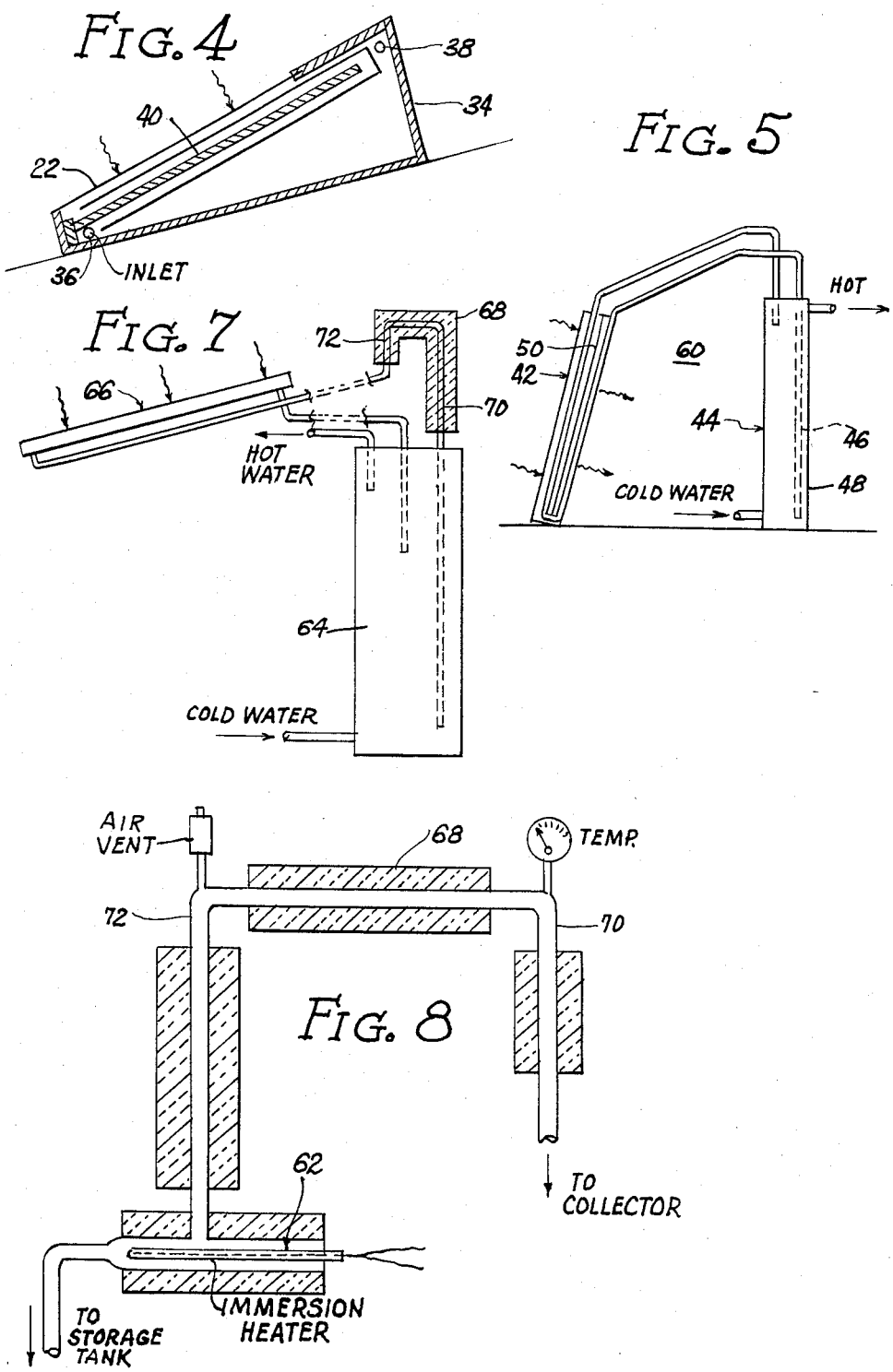

ANTI-REVERSE SIPHON SOLAR HEATING SYSTEM

BACKGROUND OF THE INVENTION

The instant invention is related to a Solar Heating System described in U.S. Pat. No. 4,428,362 issued Jan. 31, 1984. Both that patent application and this application pertain to passive solar heating units, and in particular tackle the problem of reverse flow at night when the heating chamber becomes cool.

Solar heaters are generally classified as either active or passive systems. Active systems use pumps and temperature control units to circulate hot water or other fluid heating medium from the solar collector to its hot water storage tank. Passive systems rely on the convection that naturally occurs when water which is heated in the collector rises to the top of the collector unit and then to the hot water tank which is generally stored above the collector in order to make the unit flow passively. With the hot water storage tank well above the collector, and when the collector becomes cool at night, the system stabilizes and there is no further circulation, as the cold water or other fluid stays in the lower reaches of the system (the collector), and the warmer fluid remains up in the insulated tank, which is generally on the roof.

Although this arrangement functions passively, it also requires the use of separate units and cannot be packaged into a single case for reduced material costs, ease in installation and improvements in operating efficiency without the aid of some type of check valve.

The development of an efficient, trouble-free check valve to prevent reverse flow from happening at night with the unitized tank and collector design has been the object of research for a number of years. The obvious solution to the reverse flow problem would be to provide some kind of gossamer membrane as a flap check valve in the system. However, because of the very weak convective forces, even the most gossamer of membranes used as a check flap unduly resist forward flow if it is sufficiently substantial to block reverse flow.

An effective and very clever check valve using only liquids has been devised and has been the subject of a number of patent claims. In essence, when the system is functioning in its forward, normal mode, somewhere in the tank-to-collector circulatory system is placed an upwardly directed pipe which terminates with its upper rim in a chamber right at the meniscus between the lower water body and an overlying, lightweight, imisible oil. Forward circulation is up through the pipe, which displaces the oil just enough to permit the flow of the water back downward to another passageway, away from the oil trap. However, when reverse flow is attempted, the lighter weight oil is drawn down into the pipe mentioned above, causing a negative pressure head which continually resists the reverse flow.

Although the stratefied imissible liquid check valve as described is effective and is definitely a positive check, it is also rather fragile and susceptible to malfunctions caused by rough or improper installation, and requires that exact angles be achieved so the pipe and its imissible liquid have the appropriate relationship.

The parent application for this continuation-in-part avoided the concept of the check valve entirely by providing a piping arrangement which, through the use of selectively exposing the water supply passageway to the collector to cold ambient temperatures and warm ambient temperatures, and to insulation from ambient temperatures, achieved a geometric configuration of piping which automatically established a net pressure-head which resisted reversed flow or circulation. That concept, the validity of which has been proven and which will be disclosed in a patent to be issued shortly, has been expanded in the instant application in different embodiments.

SUMMARY OF THE INVENTION

The present invention utilizes essentially the same geometrical configurations that previously were disclosed in the water heaters of the patent application, though further applications and embodiments are disclosed which take advantage of the principle to heat not only water, but for space heating as well, and for a combination of space heating and water heating.

In one embodiment, the basic system is arranged as a portion of the wall of a building. The insulated wall serves as a heat barrier between an interior, ascending air passageway which goes over the top of the wall and becomes a descending passageway leading to the bottom of the vertically-oriented heating chamber. A flat plate collector, or in another embodiment, the hot water tanks heated by a flat plate collector, are disposed in the heating chamber to heat the air from the building, which rises up and is convectively injected into the building at a higher position than the cold air inlet from the building. At night when the collector becomes cold, ordinarily in a conventional heater system it would simply dump cold air directly into what would be the cold air inlet at the bottom of the heating chamber. In the instant invention, however, the air is forced to rise to a height typically one foot or more above that of the heating chamber itself before it descends down to the cold air inlet. Thus, because the cold air must rise to a height that is generally above the height it has fallen in the heating chamber, the pressureheads balance.

In other embodiments, a "breadbox" non-pressurized solar water heater is disclosed using a wedge-shaped tank and housing which exposes a glazed face to the sun. In another embodiment, a specialized corrugated flat plate element with a frontal planar glazing differentially heats pipes to the front and rear of the opposite corrugations, the corrugations being alternately white to reflect on the forward tubing and transparent to permit passage of light through to rearwardly displace tubing, with the entire flat plate section being oriented to define a space which could be used as a greenhouse because of the penetration of substantial amounts of light past the fluid tubes on the collector plate.

An anti-reverse-siphon loop, based on these principals, may also be used. Using the "ARS" loop, a water tank separated from a collector will operate without back flow. The ARS loop extends up above the collector a foot or more, and the top of a hot water tank should be no more than a foot beneath the top of the collector. With this configuration, the hot water tank maintains hot water in the pipe which connects the hot water tank through conduction, and the other side of the loop receives cold water when the unit begins to reverse-siphon, so that the pressure heads oppose reverse flow.

BRIEF DESCRIPTION OF THE DRAWINGS

FIG. 1 is a diagrammatic vertical section illustrating the functioning of a space heater built into a structural wall;

FIG. 2 is a diagrammatically illustrated vertical section of the water heater unit of the parent application being used in combination with a space heating embodiment similar to that illustrated in FIG. 1;

FIG. 3 is a sectional view similar to that of FIG. 2, but in more detail, illustrating a unit similar to that disclosed in the parent application of this Continuation-in-Part integrated into the space heater mounted in the wall as shown in FIG. 1;

FIG. 4 is another modification illustrating a "breadbox" low-pressure solar water heater which is very simple in construction;

FIG. 5 illustrates a modification of which the hot plate has been moved forwardly and slanted away from the hot water accumulation system to create a greenhouse effect; and, FIG. 6 is a somewhat diagrammatic horizontal section illustrating the way in which the flat plate of FIG. 5 is constructed.

FIG. 7 illustrates the general design of an anti-reverse-siphon loop when the collector and storage tank are separate units;

FIG. 8 illustrates the addition of an active heating element to the ARS loop to further resist reverse flow.

DETAILED DESCRIPTION OF THE PREFERRED EMBODIMENTS

The essence of the invention is shown in FIG. 1. In order for the heater to work properly, there need be a fluid mass, which in FIG. 1 is the air in the room 10, and a fluid flow passageway comprises an ascending passageway 12 which loops over into a descending passageway 14 which is separated from the ascending passageway by means of an insulator 16, which in the embodiment of FIG. 1 takes the form of an insulated wall. At the bottom of the descending passageway, the continuous passageway flows into a heating chamber 18 in which the fluid is warmed by means of heating element 20. In this embodiment, the heating element is a flat plate absorber, which defines the heating chamber together with glazing 22.

As the sun passes through the glazing and into the absorber, air in the heating chamber 18 expands and circulates out through the upper outlet 24 while drawing fresh air into the inlet 26.

At night, the absorber will dissipate heat through the glazing and become the coldest part of the system. The heating chamber 18 will become a cooling chamber, and as the density of air in the heating chamber increases, it will develop a pressurehead and try to move downward. Ordinarily, if the bottom of the heating chamber entered directly into the room, there would be a constant, steady flow of cold air back into the room, while hot air would be drawn out of the room at the top through what was supposed to be the warm air outlet 24. With this system, however, as the cold air moves downwardly and forces warmer air up the descending passageway 14, because of the insulation 16, cold air fills the descending passageway as well as the heating chamber, equalizing the pressurehead. Backflow is thus eliminated.

It is not always desirable to prevent backflow. When it is cool outside and the house is hot, backflow would be desirable. Or, if the unit faces north, it could effectively be made to backflow even in the daytime through use of the butterfly valve 27. As illustrated in FIGS. 2 and 3, when this valve is open, the anti-reverse-siphon feature is completely negated and reverse siphoning takes place as though the loop had not been incorporated in the first place.

The same basic principle is used in the unit shown diagrammatically in FIG. 2 and in more detail in FIG. 3. The water heater unit is identically disclosed, and in considerable detail in the parent application, and is hereby incorporated by reference. This unit 28 is basically comprised of a flat plate 30 which can assume a variable angle to the horizon as indicated in FIG. 2, and hot water storage tanks 32. Just as the space heater described in FIG. 1 passively resists reverse siphoning, so does the water heater 28.

In the modification shown in FIGS. 2 and 3, rather than putting the flat plate directly into the heating chamber, the hot water tanks 32 are used for the heating element. Thus, the ascending and descending passageways, the inlet, the outlet, and the heating chamber are the same, with only the heating element being replaced by the hot water tanks of the solar hot water heater.

Turning to another embodiment as shown in FIG. 4, this "breadbox" heater is a self-enclosed low pressure unit, which is wedge-shaped to get the appropriate angles and to direct the glazing 22 into the sun. The housing 34 is filled with water, there being a typical fresh water inlet 36 and a demand hot water outlet 38. Like the embodiment of FIG. 1, the ascending and descending passageways are defined around an absorber 40. This is probably the simplest form of combined ARS flat plate collector and hot water tank that is feasible.

In yet another embodiment, FIGS. 5 and 6 disclose a unit in which the flat plate unit 42 is spaced forwardly of the tank housing 44. The tank housing could be provided in the form of a rearward wall, along with the sides being cut off by sidewalls to completely enclose the area as a greenhouse. Ascending passageway 46 extends to the bottom of the hot water tank 48, and then arches over to descend behind the corrugated partial absorber 50. As shown in FIG. 6, the ascending and descending passageways would ordinarily be provided plurally, with the descending passageways passing behind the rearwardly concave troughs 52 of the corrugated absorber 50.

The heating chamber in this embodiment is defined by the space between the glazing 54 and the corrugated absorber 50. Tubes 56 pass through the heating chambers and down into the tops of the hot water tanks 48.

The areas of the corrugated sheet 52 behind the tubes 56 is painted white or covered with some other reflective coating to direct sunlight onto the tubes 56, which are preferably EPDM, or other synthetic material capable of sustaining high temperatures without damage. The areas 58 in front of the descending tubes is transparent, permitting sunlight to pass through to warm these tubes, and also into the greenhouse 60. Although shown as being tied together in FIG. 6, the tanks 48 could clearly be separate.

FIG. 7 illustrates a configuration which the tank 64 is separated from the collector 66, and an insulated ARS loop is positioned between them. Operating conditions for optimal functioning of this configuration dictate that the top of the loop be a least a foot above the top of the collector, and the top of the hot water tank be no more than a foot below the top of the collector.

When these conditions are met, the right side 70 of the ARS loop will remain fairly warm because the entire loop is insulated, and the right side receives heat conductively from the hot water tank. The left side 72, on the other hand, will be cooler than the right side when reverse flow initiates, causing a negative pressure head in the ARS loop, terminating the reverse flow.

Yet another implementation of the invention is enhanced by the anti-reverse siphoned heater structure shown at 62 in FIG. 8. This heater would ordinarily be an immersion heater having a power rating of 100–200 watts, and is disposed in the ascending passageway of any of the embodiments. If the temperature changes and the other variables are such that there is some backflow, the immersion heater can be actuated to heat the water in the ascending passageway to further resist backflow. If turned high enough, the heater would cause forward flow, thus effecting sufficient circulation to keep the unit from freezing.

In all these embodiments, solar energy is used in a totally passive manner, except for the optional immersion heater, to heat both space, water, and a combination of water and space. The concept is simple and easy to implement, and requires no delicacy in handling, and achieves yet another step in the passive heating arts.

What is claimed is:

1. An anti-reverse siphon fluid heating system for heating a fluid mass comprising:
    (a) a continuous fluid flow passageway, comprising, in downstream order,
        (i) an ascending passageway having at the bottom thereof an inlet from said fluid mass;
        (ii) a descending passageway communicating at its top to the top of said ascending passageway through an inversion loop, an insulation positioned between said ascending and descending passageways for thermallly insulating said descending passageway from said ascending passageway;
        (iii) an ascending heating chamber communicating with the bottom of said loop, and having a hot fluid outlet at the top thereof for communicating with said fluid mass to deliver hot fluid thereinto;
    (b) a heating element heated by energy derived from the sun and disposed in said heating chamber, whereby while said heating element heats fluid in said chamber, natural convection forces hot fluid through said outlet, and when said heating element is dormant, pressure heads in said ascending and descending passageways block reverse circulation of the system.

2. Structure according to claim 1 wherein said heating system is defined as an integral part of the exterior wall of a building, said passageways are substantially planar, and the insulation between said ascending and descending passageways comprises a portion of an insulated wall of the building.

3. Structure according to claim 2 and including a glazing layer is spaced outwardly from said wall to define said heating chamber therewith, and said heating element comprises a flat plate absorber spaced between said wall and glazing layer.

4. Structure according to claim 2 wherein said heating element comprises at least one hot water storage tank disposed in said heating chamber.

5. Structure according to claim 4 wherein said hot water storage tank is part of a passive anti-reverse-siphon water heating system.

6. Structure according to claim 1 wherein said fluid mass is enclosed in a housing which encloses said heater, said housing having a glazed face to be directed toward the sun, a flat plate, insulating wall, and baffles spaced parallely behind the glazing, such that said glazing and flat plate define said heating chamber, said flat plate and wall define said descending chamber, and said wall and baffle define said ascending chamber, said housing being wedge-shaped with a bottom surface generally horizontally extended when lying on a roof and with said glaze surface having a substantial vertical component to capture the sun.

7. Structure according to claim 1 wherein a valved opening is provided through the insulation at the bottoms of said ascending and descending passageways to permit the selective communication between said passageways, such that opening said valve would permit the system to reverse-siphon.

* * * * *